United States Patent
Hausmann

(10) Patent No.: US 6,964,988 B2
(45) Date of Patent: Nov. 15, 2005

(54) SCUFF RESISTANT IONOMERS COMPOSITIONS

(75) Inventor: Karlheinz Hausmann, Auvernier (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/266,423

(22) Filed: Oct. 8, 2002

(65) Prior Publication Data

US 2003/0119951 A1 Jun. 26, 2003

Related U.S. Application Data

(60) Provisional application No. 60/327,811, filed on Oct. 9, 2001.

(51) Int. Cl.$^7$ ................................................. C08K 5/15
(52) U.S. Cl. ........................ 524/111; 524/166; 524/312; 524/317; 524/375; 524/910
(58) Field of Search ................................ 524/375, 312, 524/166, 111, 317, 910

(56) References Cited

U.S. PATENT DOCUMENTS

| | | | |
|---|---|---|---|
| 3,262,272 A | | 7/1966 | Barakauskas et al. |
| 3,264,269 A | | 8/1966 | Rees |
| 3,317,631 A | | 5/1967 | Rees |
| 3,445,362 A | * | 5/1969 | Chow et al. ............. 428/411.1 |
| 3,472,825 A | * | 10/1969 | Walter et al. ............ 525/330.2 |
| 3,595,827 A | * | 7/1971 | Foster ........................ 524/230 |
| 5,037,875 A | | 8/1991 | deGaravilla |
| 6,624,221 B2 | * | 9/2003 | Takesue et al. ............. 524/277 |
| 6,630,528 B2 | * | 10/2003 | Hausmann et al. ......... 524/315 |

FOREIGN PATENT DOCUMENTS

| | | |
|---|---|---|
| EP | 0494073 A1 | 7/1992 |
| GB | 2360289 A | 9/2001 |
| WO | WO 95/07178 | 3/1995 |
| WO | WO 95/08593 | 3/1995 |
| WO | WO 95/11333 | 4/1995 |

OTHER PUBLICATIONS

PCT International Search Report for International Application No. PCT/US02/33396.

* cited by examiner

Primary Examiner—Bernard Lipman

(57) ABSTRACT

The invention relates to a thermoplastic composition comprising at least a copolymer of ethylene and an $\alpha,\beta$-unsaturated $C_3$–$C_8$ carboxylic acid, from about 10 to 99.9% neutralized with Lithium, and at least from about 0.01 wt % to about 2 wt % of a migrating antistatic agent. The invention also relates to films, sheet and molded articles comprising the above composition. The composition, film, sheet or molded article of the invention show good antistatic properties and preferably have a surface resistivity equal or less than $10E^{11}$. The composition, film, sheet or molded article of the invention can in particular be used as a protective transparent coating or layer on abrasion and scratch-exposed objects.

16 Claims, No Drawings

SCUFF RESISTANT IONOMERS COMPOSITIONS

This application claims the benefit of U.S. Provisional Application No. 60/327,811, filed Oct. 9, 2001.

FIELD OF THE INVENTION

The present invention relates to ethylene copolymer ionomer compositions comprising a migrating antistatic agent. These compositions are useful for fabricating films, sheets and molded articles of scratch/abrasion resistant material with superior antistatic properties.

BACKGROUND OF THE INVENTION

Ionomers are thermoplastic resins that contain metal ions in addition to organic-chain molecules. Ionomers have solid-state properties characteristic of cross-linked polymers and melt-fabricability properties characteristic of uncrosslinked thermoplastic polymers. Some ionomers are disclosed in U.S. Pat. No. 3,262,272.

Major applications of ionomers are in the areas of packaging and for sporting goods. The use and advantages of such ionomers are described in EP 0 730 622 A1 or WO95/07178 which describes the advantage of ionomers as scuff and scratch resistant top layers.

So far where problems of scratching or scuffing a surface or a film made of an ionomer film or sheet arose, these problems had to be overcome by crosslinking these ionomers by external crosslinking agents such as organic compounds or epoxy and formaldehyde functionalities.

WO 95/11333 discloses a composition made up of ethylene carboxylic acid ionomers and polyfunctional polymerisable olefinic compounds comprising a polyfunctional acrylic or methacrylic ester that provides sufficient crosslinking in order to achieve the scuff resistance necessary to use these ionomers in wear resistant floor tile applications. However, the production of such composition necessitates elevated temperatures and is therefore very difficult to control.

U.S. Pat. No. 3,317,631 describes thermosetting compositions based on ethylene carboxylic acid copolymers and melamine formaldehyde resins giving essentially a thermoset polymer without possibility of thermoplastic processability.

U.S. Pat. No. 3,264,269 teaches a process for crosslinking polymers containing carboxyl groups which comprises imbibing a shaped article of the polymer in a diisocyanate. The disadvantage of this process is its 2 step nature (processing+imbibing) combined with the toxic nature of diisocyanates.

Furthermore, it would be very interesting to have scratch and scuff resistant compositions or films which would not retain dust and dirt during use. It has already been proposed to blend ionomers with antistatic additives. However due to the very polar character of ionomers, a big amount (more than 2 weight percent (wt %) based on total ionomer) of antistatic additives is needed in order to observe any improvement in antistatic performance. Moreover, this process may take several weeks. This solution is therefore not recommended economically speaking.

U.S. Pat. No. 5,037,875 describes an improvement in the antistatic performance of a film of ethylene copolymer ionomers by providing a synergistic additive combination of sorbitan monolaureate and an alkyl phenyl poly(ethylene oxide). However, this combination is for instance not suitable in certain specific applications like floor tiles applications where a surface resistivity of not more than $10E^{10}$–$10E^{11}$ is required.

Therefore, there is still a need for an ethylene copolymer ionomer based composition which would be scratch and scuff resistant and which at the same time would show sufficient antistatic properties in order to be suitable for specific applications requiring very low surface resistivity such as floor tiles applications.

Now, it has been surprisingly found that by combining migrating antistatic agents with an ethylene copolymer ionomer specifically neutralized by Li ions, it was possible to provide a composition having excellent scratch and scuff resistance properties as well as excellent antistatic properties.

SUMMARY OF THE INVENTION

A first aspect of the invention is a thermoplastic composition comprising:

i) at least a copolymer of ethylene and an $\alpha,\beta$-unsaturated $C_3$–$C_8$ carboxylic acid, from about 10 to 99.9% neutralized with Lithium, and ii) at least from about 0.01 wt % to about 2 wt % of a migrating antistatic agent.

Another aspect of the invention is a film comprising the composition above.

Another aspect of the invention is a molded article comprising the composition above.

The thermoplastic composition of the invention is useful for producing a film or sheet or molded articles of abrasion and scratch-resistant transparent material. The composition, film, sheet or molded article of the invention show good antistatic properties and preferably have a surface resistivity equal or less than $10E^{11}$. The composition, film, sheet or molded article of the invention can in particular be used as a protective transparent coating or layer on abrasion and scratch-exposed objects.

The ethylene copolymer composition of the present invention overcomes the aforementioned problems of scratching and scuffing by providing a means of superior crosslink surprisingly obtained by neutralizing the copolymer with Li ions.

Additionally and surprisingly it was discovered that the composition of the invention develops low values of surface resistivity within a short period of time, in particular within less than 2 weeks. Moreover, it was found that this result could be achieved by employing only low amounts of antistatic agents, for instance with less than 2 wt % of migrating antistatic agents.

The compositions of the invention are therefore very interesting from an economical and industrial point of view.

DETAILED DESCRIPTION OF THE INVENTION

The ionomers used in the present invention are copolymers of ethylene and an $\alpha,\beta$-unsaturated $C_3$–$C_8$ carboxylic acid, from about 10 to 99.9% neutralized with Lithium. They optionally can comprise at least one softening comonomer that is co-polymerizable with ethylene. The preferred $\alpha,\beta$-unsaturated $C_3$–$C_8$ carboxylic acid are acrylic and methacrylic acids. Preferably, the $\alpha,\beta$-unsaturated $C_3$–$C_8$ carboxylic acid is present in the copolymer in an amount ranging from 10 wt % to 30 wt %, relative to the weight of the copolymer.

Preferably, neutralization will be from about 50% to 99%. Preferably the copolymer has from about 35 to about 70% of the carboxylic acid groups ionized by neutralization with Lithium.

The copolymer may further contain an acrylate, and may be processed by e.g. extruding or casting a sheet or blowing a film, or injection molding a molded article.

Ionomers and their methods of manufacture are described in U.S. Pat. No. 3,264,272. Suitable ionomers for use in the present invention are commercially available under the trademark SURLYN® commercially available from E. I. du Pont de Nemours and Company, Wilmington, Del.

By "migrating antistatic agents" is meant herein agents which are initially part of the homogenous composition of a film, which then migrate to the surface of said film during a given amount of time, and therein form a continuous external thin layer which provides antistatic properties to the film.

The migrating antistatic agents suitable for the present invention include antistatic agents having a molecular weight equal or lower than 5000 g/mol. The migrating antistatic agents include sorbitan monofatty acids, sorbitan monofatty acid esters, alkylphenolpoly(ethylene oxide), Na n-paraffin sulfonates, glycerol monofatty acids and their derivatives such as esters, and mixtures thereof.

The migrating antistatic agent is present in the composition of the invention in an amount ranging from about 0.01 wt % to about 2 wt %.

In a preferred embodiment of the invention, the composition shows a surface resistivity of less than $10E^{11}$, more preferably of less than $10E^{10}$.

In a preferred embodiment of the invention, the melt flow index (MFI) of the composition of the invention is comprised between 0.1 and 3.

The advantage of the invention can be manifold in various applications. Primarily this is important for applications where the aforementioned ionomers are employed as a scratch or scuff resistant surface layer and eliminates the need for external crosslinking agents in order to achieve the same improvement.

More particularly, the ethylene copolymer compositions of the present invention can be used as protective coatings or layers on wear and scratch-exposed objects. For example, they can be used as wear layers on floor tiles or as protective layers for skis or other wear and scratch exposed objects that require favorable antistatic properties in order to avoid dust and dirt collection.

EXAMPLES

Materials used:

All ionomers are based on ethylene acid copolymer with wt % methacrylic acid as indicated in the following Table.

Ionomers I1, I2, and I3 can be obtained commercially under the tradename Surlyn® from E.I. du Pont de Nemours and Company.

AS1 is an antistatic agent commercially obtainable under the tradename Atmer®670antistatic agent from Ciba.

AS 2 is an antistatic agent commercially obtainable under the tradename Dehydat®93P antistatic agent from Henkel.

|    | Ion     | % Neutr | % MAA | MFI |
|----|---------|---------|-------|-----|
| I1 | $Li^+$  | 52      | 15    | 1.8 |
| I2 | $Na^+$  | 54      | 10    | 1.0 |
| I3 | $Zn^{2+}$ | 58    | 15    | 0.7 |

The Examples described below were run by preparing a sheet of the respective resin or the resin plus masterbatch blend on a laboratory 2-roll mill and pressing the so-obtained ionomer resin sheet in a hydraulic press into plaques of the dimension 100×100×3 mm. These plaques were then tested immediately, and after 1 month, for scuff resistance using a scuff tester by Eirichsen according to ISO1518 where a weight between 0.1 and 2 kg is applied onto a needle which is drawn over the surface of the plaque. This apparatus measures the weight in Newton at which a scratch mark is visible on the surface.

Examples/Results

| Ionomer | Load where visible scratch appears |
|---------|-----------------------------------|
| I1      | 15 N                              |
| I3      | 9 N                               |

As can be seen from the examples above Lithium ionomers are exhibiting an excellent scratch resistance, even superior to the scratch resistance of Zn ionomers commonly used and claimed for floor tile applications.

Furthermore it can be seen that antistatic agents commonly employed in polyolefins are not effective in Na ionomers at a level of 2wt % and are only marginally effective in Zn ionomers at these levels. On the other hand, surprisingly and unexpectedly they show exceptional performance at these levels in Li ionomers reaching surface resistivity and volume resistivity levels as low as $10 E^{10}$–$E^{11}$. Surface and Volume resistivity was measured on compression molded plaques with a thickness of 3 mm and dimension of 10×10 cm according to ASTM D257 on a Hewlett Packard high resistance meter 4329A/Cell 16008A.

Comparative Table—Surface & Volume Resistivity Measured After 600 h@ 50% RH

|      | Ionomer | wt % AS1 | wt % AS2 | Sur Res         | Vol Res           |
|------|---------|----------|----------|-----------------|-------------------|
| Ex 1 | I1      | 2        |          | $5.1\ 10E^{10}$ | $2 \times 10E^{10}$ |
| Ex 2 | I1      |          | 2        | $0.44\ 10E^{10}$| $2 \times 10E^{10}$ |
| C1   | I3      | 2        |          | $4 \times 10E^{11}$ | $2 \times 10E^{13}$ |
| C2   | I3      |          | 2        | $1 \times 10E^{12}$ | N/A              |
| C3   | I2      | 2        |          | $>1 \times 10E^{16}$ | $>1 \times 10E^{16}$ |
| C4   | I2      |          | 2        | $>1 \times 10E^{16}$ | $>1 \times 10E^{16}$ |

RH stands for Relative Humidity.

What is claimed is:

1. A scratch-resistant ionomer composition comprising:
   i) at least a copolymer of ethylene and an α,β-unsaturated C3–C8 carboxylic acid, from about 10 to 99.9% neutralized with Lithium, and
   ii) at least from about 0.01 wt % to about 2 wt % of a migrating antistatic agent based on weight of total ionomer composition;

wherein the scratch resistant composition has a scratch resistance greater than 9N when measured according to ISO1518 and a surface resistivity of less than $10E^{11}$ when measured according to ASTM D257.

2. A composition according to claim 1, wherein the α,β-unsaturated $C_3$–$C_8$ carboxylic acid is acrylic acid or methacrylic acid.

3. A composition according to claim 1, wherein the α,β-unsaturated $C_3$–$C_8$ carboxylic acid is present in the copolymer in an amount ranging from 10 wt % to 30 wt %, relative to the weight of the copolymer.

4. A composition according to claim 1, wherein the copolymer is from 50% to 99% neutralized with Li.

5. A composition according to claim 1, wherein the migrating antistatic agent is selected from the group consisting of sorbitan monofatty acids, sorbitan monofatty acid esters, alkylphenolpoly(ethylene oxide), Na n-paraffin sulfonates, glycerol monofatty acids and their derivatives, and mixtures thereof.

6. A composition according to claim 1, characterized by a surface resistivity of less than $10E^{10}$.

7. A film comprising a composition according to claim 1.

8. A molded article comprising a composition according to claim 1.

9. The film or the molded article according to claims 7 or 8, characterized in that it is transparent.

10. The composition of claim 1, further comprising an acrylate that is not an acrylate salt.

11. Packaging comprising a composition according to claim 1.

12. Sporting goods comprising a composition according to claim 1.

13. A floor tile comprising a composition according to claim 1.

14. A wear layer on floor tiles, said wear layer comprising a composition according to claim 1.

15. A protective layer for skis, said protective layer comprising a composition according to claim 1.

16. A method of increasing the abrasion resistance of a thermoplastic composition having antistatic properties, said method comprising providing an ethylene acid copolymer;

partially neutralizing said ethylene acid copolymer with lithium; and blending said ethylene acid copolymer or said neutralized ethylene acid copolymer with a migrating antistatic agent.

\* \* \* \* \*